(12) United States Patent
Cyrusian

(10) Patent No.: US 6,260,085 B1
(45) Date of Patent: Jul. 10, 2001

(54) CHANGEOVER DEVICE WHICH USES BOTH ANALOG AND DIGITAL SIGNALS AS INPUT SIGNALS AND SUPPLIES AN ANALOG OUTPUT SIGNAL

(75) Inventor: Sasan Cyrusian, München (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/162,815

(22) Filed: Sep. 29, 1998

(30) Foreign Application Priority Data

Sep. 29, 1997 (DE) .............................. 197 43 002

(51) Int. Cl.⁷ .............................. G11B 15/04; G11B 5/86; H03M 1/10; H04N 5/262; H04N 1/40
(52) U.S. Cl. .............................. 710/69; 710/65; 710/129; 710/62; 360/23; 360/32; 360/60; 341/108; 341/120
(58) Field of Search ................................... 341/154, 108, 341/144, 142, 110; 710/69

(56) References Cited

U.S. PATENT DOCUMENTS

| | | | |
|---|---|---|---|
| 4,901,168 | * | 2/1990 | Yoshidat et al. ............ 360/60 |
| 5,295,023 | * | 3/1994 | Sekii ........................ 360/32 |
| 5,373,292 | * | 12/1994 | Yasuda ...................... 341/108 |
| 5,493,300 | | 2/1996 | Eiler et al. . |
| 5,530,599 | * | 6/1996 | Sekigawa .................... 360/23 |
| 5,691,821 | * | 11/1997 | Hieda et al. ................ 358/445 |
| 5,801,789 | * | 9/1998 | Zeidler et al. .............. 348/589 |
| 6,100,828 | * | 8/2000 | Sparks ...................... 341/120 |

FOREIGN PATENT DOCUMENTS

| | | |
|---|---|---|
| 0 436 984 A1 | 7/1991 | (EP) . |
| 0 443 064 A1 | 8/1991 | (EP) . |
| 0 641 084 A2 | 3/1995 | (EP) . |

* cited by examiner

Primary Examiner—Thomas Lee
Assistant Examiner—Katharina Schuster
(74) Attorney, Agent, or Firm—Herbert L. Lerner; Laurence A. Greenberg; Werner H. Stemer

(57) ABSTRACT

The invention relates to a changeover device which uses both analog and digital signals as input signals and supplies an analog output signal. The changeover device contains a digital-to-analog converter whose output level is adjustable. Matching to the level of the analog input signal is thus achieved. Preferred applications of the invention are picture-in-picture insertions in which an additional picture in analog form is intended to be inserted into a main picture in digital form.

15 Claims, 2 Drawing Sheets

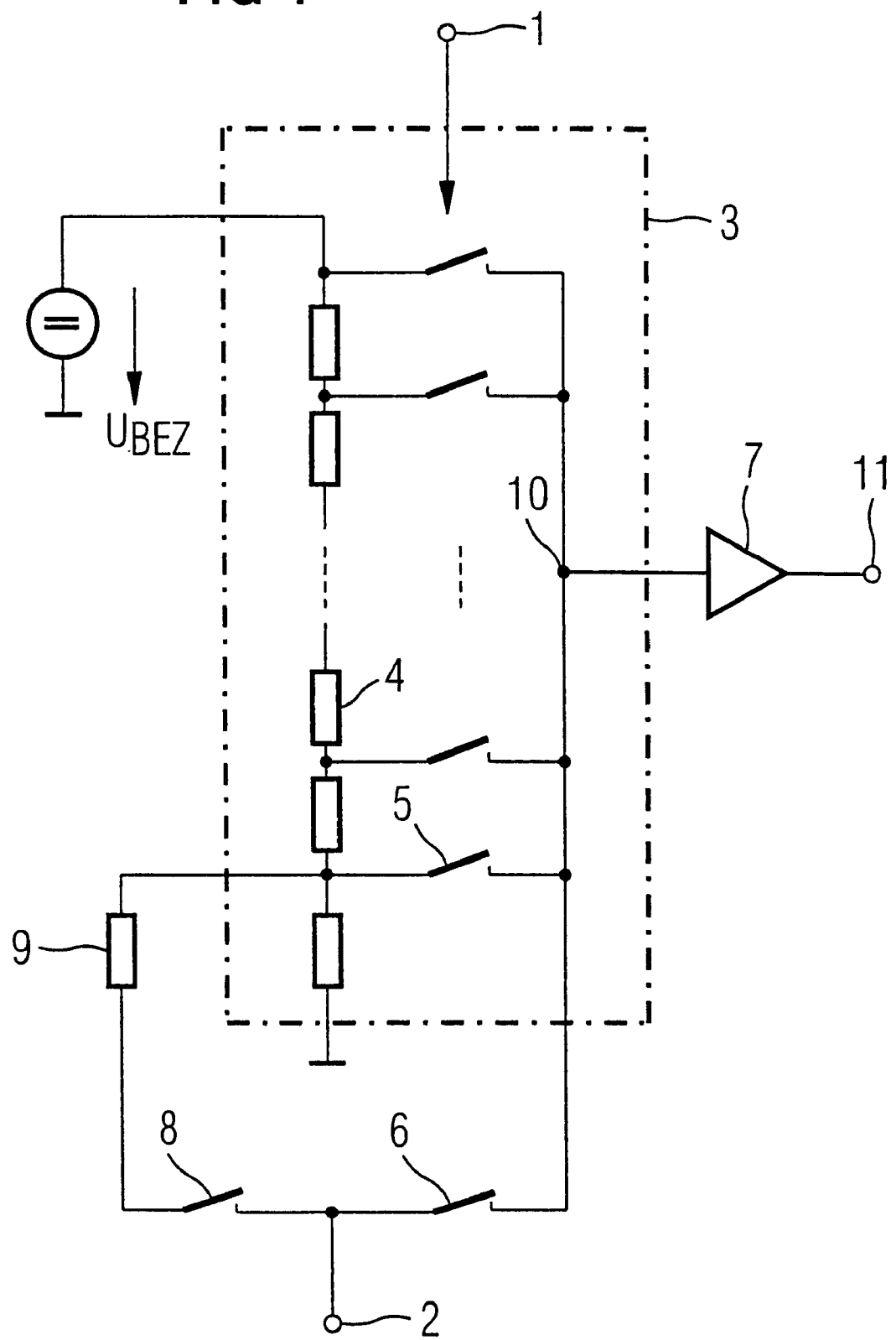

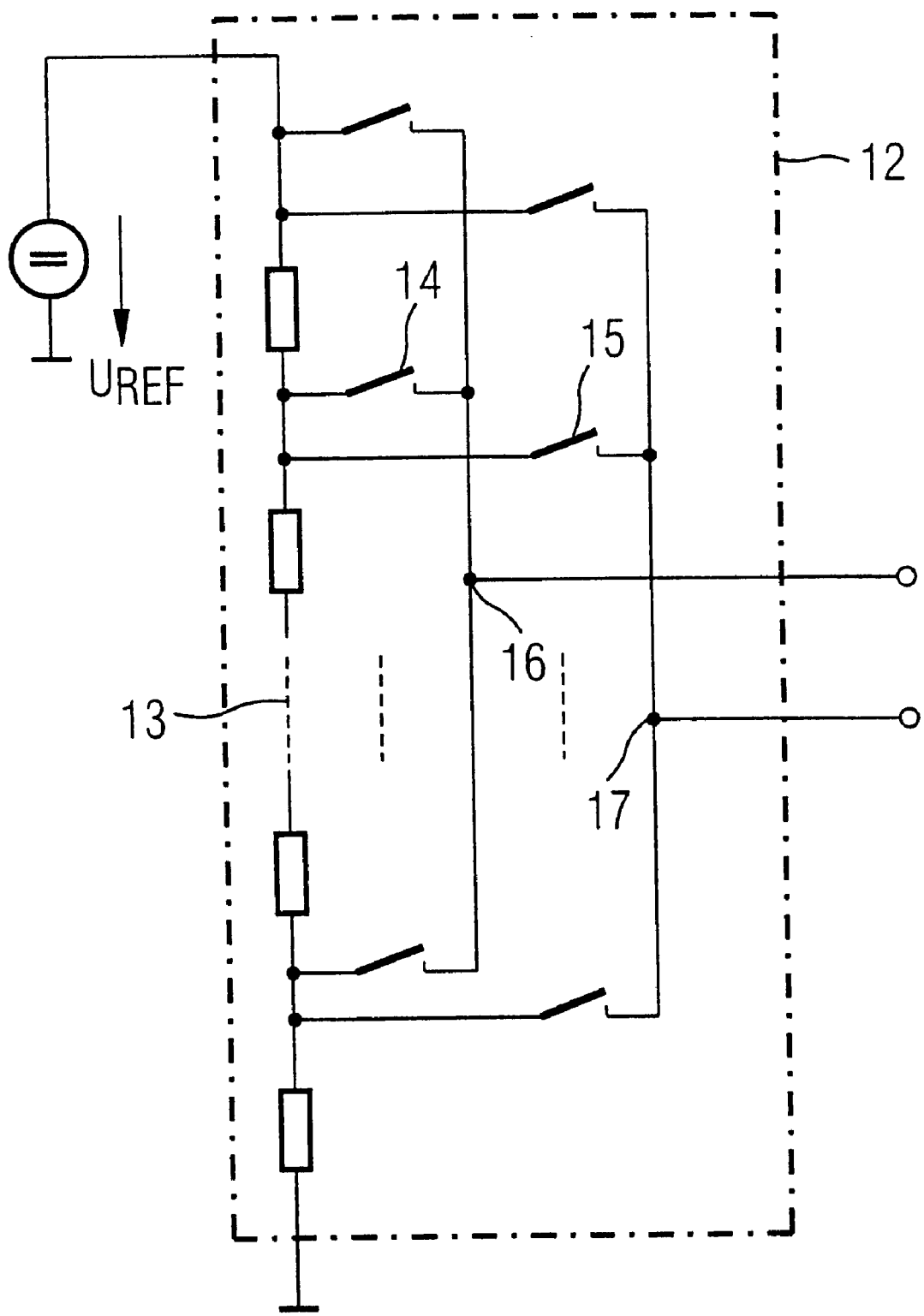

CHANGEOVER DEVICE WHICH USES BOTH ANALOG AND DIGITAL SIGNALS AS INPUT SIGNALS AND SUPPLIES AN ANALOG OUTPUT SIGNAL

BACKGROUND OF THE INVENTION

Field of the Invention

The invention relates to a changeover device which uses both analog and digital signals as input signals and supplies an analog output signal.

Such a changeover device can be used wherever an analog output signal has to be available for further processing and the analog output signal can be obtained both from a digital input signal and from an analog input signal.

In television technology, analog and digital signals are often processed at the same time. The video signal which is broadcast by the television stations for the purpose of television picture transmission, is converted into the baseband in a television receiver and is present as a color, video, blanking, syncs signal (CVBS), has an analog nature. If the picture information of the CVBS signal is intended to be processed further, it is frequently converted into a digital video signal in order to utilize the advantages of digital signal processing. Picture-in-picture insertions constitute an example of this. The analog picture information of an additional picture which is intended to be inserted into a main picture as a picture that is reduced in size is processed after analog-to-digital conversion. The processing of the digital video signal may serve for example for matching the format of the additional picture to the main picture. After processing, the digital video signal is converted back into an analog video signal, from which RGB signals are generated which can be fed to a picture tube.

The amplitude of the RGB signals should be independent of whether they are obtained directly from an analog signal or from an analog signal after analog-to-digital conversion and subsequent digital-to-analog conversion.

SUMMARY OF THE INVENTION

It is accordingly an object of the invention to provide a changeover device for analog and digital signals, which overcomes the above-mentioned disadvantages of the heretofore-known devices and methods of this general type and which generates from both analog and digital input signals an analog output signal the amplitude of which is independent of whether it is obtained from the analog or the digital input signal.

With the foregoing and other objects in view there is provided, in accordance with the invention, a changeover device, comprising:

a digital signal input for receiving a digital input signal, an analog signal input for receiving an analog input signal, and an output for outputting an analog output signal;

a digital-to-analog converter connected to the digital signal input;

a driver driving the output of the changeover device and having an input;

the digital-to-analog converter having a voltage divider connected between a reference-ground voltage and the driver, wherein a division ratio can be set in dependence on the digital input signal and a part of the reference-ground voltage determined by the division ratio can be fed to the input of the driver; and a switch connected between the analog signal input and the input of the driver for selectively supplying the analog input signal to the driver.

In other words, the objects of the invention are satisfied by a changeover device having inputs for a digital input signal and an analog input signal and having an output for an analog output signal, and also having a digital-to-analog converter, which has a voltage divider between a driver and a reference-ground voltage, whose division ratio can be set in dependence on the digital input signals, and via which a part of the reference-ground voltage, which part is determined by the division ratio, can be fed to an input of the driver, the input for the analog input signal being connected via a first switch to the input of the driver and the driver supplying the analog output signal on the output side.

The invention has the advantage that it manages with just one driver for the analog and the digital input signal. A further advantage of the changeover device according to the invention is the fact that analog input signals having different levels can be used.

In accordance with an added feature of the invention, a second switch and a limiting resistor are connected between the analog signal input and the voltage divider.

In accordance with an additional feature of the invention, the voltage divider contains a series circuit of resistors.

The second switch is closed when a CVBS signal is clamped at an input quiescent level in the event of using a video signal as analog input signal.

In accordance with another feature of the invention, a further digital-to-analog converter supplies the reference-ground voltage. The further digital-to-analog converter is connected to a reference voltage and is adapted to adjust the reference-ground voltage in steps.

In accordance with a further feature of the invention, the further digital-to-analog converter contains at least three series-connected converter resistors and at least one switch series comprising selector switches, the selector switches each being connected to one another on one side and between two converter resistors, respectively, on the other side.

In accordance with again another feature of the invention, the at least one switch series are three switch series.

In accordance with a concomitant feature of the invention, the digital input signal is a digital video signal for generating a main picture and the analog input signal is an analog video signal for an additional picture selectively insertable into the main picture.

Furthermore, the reference-ground voltage is preferably adjusted by means of a further digital-to-analog converter. That voltage can be altered in the course of operation.

Other features which are considered as characteristic for the invention are set forth in the appended claims.

Although the invention is illustrated and described herein as embodied in a changeover device for analog and digital signals, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a circuit schematic of a changeover device according to the invention; and FIG. 2 is a circuit schematic of a circuit for generating a reference voltage.

DESCRIPTION OF THE PREFERRED EMBODIMENTS

Referring now to the figures of the drawing in detail and first, particularly, to FIG. 1 thereof, there is seen a changeover device according to the invention with a first digital-to-analog converter 3. The latter has a series circuit of resistors 4 across which a reference-ground voltage $U_{RG}$ from a voltage source is present. The connection paths (nodes) between the resistors 4 are each connected to one side of a converter switch 5. The other side of each converter switch 5 is connected to a node 10, which represents the output of the first digital-to-analog converter 3. This is connected to the input of a driver 7. An analog output signal can be picked off at the output 11 of the driver 7.

The series circuit comprising the resistors 4 forms a first voltage divider. Depending on the value of a digital input signal at an input 1 of the first digital-to-analog converter 3, one of the converter switches 5 is closed and, as a result, the division ratio of the first voltage divider is set. Depending on which of the converter switches 5 is closed, a voltage of varying magnitude is present across the input of the driver 7. The largest voltage at the input of the driver 7 occurs when the input of the driver 7 is directly connected to the voltage source having the reference-ground voltage $U_{RG}$.

The node 10 is additionally connected via a first switch 6 to an input 2 for an analog input signal. The input 2 is connected via a second switch 8 and a current limiting resistor 9, which is connected in series with the latter, to one of the connection paths between the resistors 4. This connection path is the connection path after the first resistor of the series circuit comprising the resistors 4, which first resistor is directly connected to the lower potential of the reference-ground voltage $U_{RG}$.

In order to provide the reference-ground voltage $U_{RG}$, it is possible to use a circuit for generating the reference-ground voltage according to FIG. 2. The circuit has a second digital-to-analog converter 12, which includes series-connected converter resistors 13. The latter form a second voltage divider. A reference voltage $U_{REF}$ is present across said second voltage divider. The series-connected converter resistors 13 are connected to a first switch series 14 and to a second switch series 15.

The first switch series 14 contains first selector switches which are each connected by one side to the connection paths between in each case two of the series-connected converter resistors 13, and are each connected by their other side to a second node 16. Second selector switches of the second switch series 15 are likewise each connected by one side to the connection paths between in each case two of the series-connected converter resistors 13, and are each connected by the other side to a third node 17. The node 16 represents a first output, at which a first adjustable output voltage is made available, and the node 17 represents a second output, at which a second adjustable output voltage is made available. The output voltages can each be used as reference-ground voltage $U_{RG}$.

The switch series 14 and 15 can be driven independently of one another. The driving is effected in each case by means of digital signals, a specific voltage magnitude being assigned to a specific digital signal value. The method of operation of the second digital-to-analog converter 12 corresponds to that of the first digital-to-analog converter 3. The first output voltage of the circuit 12 can be adjusted via the first switch series 14, and the second output voltage of the circuit 12 can be adjusted via the switch series 15. The series-connected converter resistors 13 therefore serve for the mutually independent adjustment of two output voltages. By analogy with the first and second switch series 14, 15, it is also possible to provide further switch series in order to be able to adjust further output voltages.

The circuit for generating the reference-ground voltage $U_{RG}$ according to FIG. 2 enables a plurality of changeover devices according to FIG. 1 to be operated, for example one each for a video signal which contains the picture information for the picture component in one of the three primary colors red, green and blue.

For example, an analog video signal for an additional picture which is intended to be inserted into a main picture is applied to the input 2 for the analog input signal. A video signal for the main picture is present for example in digital form at the input 1 for the digital input signal. The first digital-to-analog converter 3 supplies, at the first node 10, an output voltage whose magnitude differs from the value of the digital video signal at the input 1 for the digital input signal and from the magnitude of the reference-ground voltage $U_{RG}$. This is set by means of the second digital-to-analog converter 12. For this purpose, for example, the switch series 14 is driven by a digital signal which serves for setting the reference-ground voltage $U_{RG}$, such that the division ratio of the second voltage divider of the second digital-to-analog converter 12 assumes a specific division ratio. Given this specific division ratio, the reference-ground voltage $U_{RG}$ is available at the second node 16 with a value which corresponds to the applied digital signal for setting the reference-ground voltage $U_{RG}$. The magnitude of the reference-ground voltage $U_{RG}$ is preferably chosen such that the output voltage at the node 10 of the first digital-to-analog converter 3 has a maximum amplitude which largely corresponds to that of the analog input signal at the input 2. The level of the output signal at the output 11 for the analog output signal is then independent of whether the driver 7 amplifies a signal which originates from the analog video signal for the additional picture or from the digital video signal for the main picture. It is presupposed here that the analog video signal has a constant level.

If the first switch 6 is closed and the digital video signal for the main picture has a value in the case of which all the converter switches 5 are open, the analog video signal for the additional picture is amplified by the driver 7 and fed to the output 11. In the event of an open first switch 6 and a value of the digital video signal for the main picture in the case of which one of the converter switches 5 is closed, the analog video signal for the main picture, which analog video signal is obtained from the digital video signal for the main picture, is fed via the driver 7 to the output 11.

The first switch 6 and the second switch 8 have to be rated only for the analog video signal in respect of the current-carrying capacity.

The second switch 8 is closed only when the analog input signal at the input 2 is intended to be clamped.

In order to be able to correctly further process the information items contained in a CVBS signal, signal separation of the individual information items is necessary. This means that the CVBS signal must be referred to a uniform level, this being referred to as clamping. Clamping circuits are known for the purpose of clamping; they are not described in any detail here.

The driver 7 may comprise an operation amplifier which has feedback to its inverting input.

I claim:

1. A changeover device, comprising:

a digital signal input for receiving a digital input signal, an analog signal input for receiving an analog input signal, and an output for outputting an analog output signal;

a digital-to-analog converter connected to said digital signal input;

a driver driving said output of the changeover device and having an input;

said digital-to-analog converter having a voltage divider connected between a reference-ground voltage and said driver, wherein a division ratio can be set in dependence on the digital input signal and a part of the reference-ground voltage determined by the division ratio can be fed to said input of said driver; and a switch connected between said analog signal input and said input of said driver for selectively supplying the analog input signal to said driver.

2. The changeover device according to claim 1, wherein said switch is a first switch, and including a second switch and a limiting resistor connected between said analog signal input and said voltage divider.

3. The changeover device according to claim 1, wherein said voltage divider contains a series circuit of resistors.

4. The changeover device according to claim 1, which comprises a further digital-to-analog converter supplying the reference-ground voltage, said further digital-to-analog converter being connected to a reference voltage and being adapted to adjust the reference-ground voltage in steps.

5. The changeover device according to claim 4, wherein said further digital-to-analog converter contains at least three series-connected converter resistors and at least one switch series comprising selector switches, said selector switches each being connected to one another on one side and between two converter resistors, respectively, on the other side.

6. The changeover device according to claim 5, wherein said at least one switch series are three switch series.

7. The changeover device according to claim 1, wherein the digital input signal is a digital video signal for generating a main picture and the analog input signal is an analog video signal for an additional picture selectively insertable into the main picture.

8. A changeover device, comprising:

a digital signal input for receiving a digital input signal, an analog signal input for receiving an analog input signal, and an output for outputting an analog output signal;

a digital-to-analog converter connected to said digital signal input;

a driver driving said output and having an input;

said digital-to-analog converter having a voltage divider adjusting said output such that an amplitude of said output is independent on whether said output is obtained from said analog or said digital input signal; and a switch connected between said analog signal input and said input of said driver for selectively supplying the analog input signal to said driver.

9. The changeover device according to claim 8, wherein said voltage divider is connected between a reference-ground voltage and said driver, wherein a division ratio can be set in dependence on the digital input signal and a part of the reference-ground voltage determined by the division ratio can be fed to said input of said driver.

10. The changeover device according to claim 8, wherein said switch is a first switch, and including a second switch and a limiting resistor connected between said analog signal input and said voltage divider.

11. The changeover device according to claim 8, wherein said voltage divider contains a series circuit of resistors.

12. The changeover device according to claim 8, includes a further digital-to-analog converter supplying the reference-ground voltage, said further digital-to-analog converter being connected to a reference voltage and being adapted to adjust the reference-ground voltage in steps.

13. The changeover device according to claim 12, wherein said further digital-to-analog converter contains at least three series-connected converter resistors and at least one switch series having selector switches, said selector switches each being connected to one another on one side and between two converter resistors, respectively, on the other side.

14. The changeover device according to claim 13, wherein said at least one switch series are three switch series.

15. The changeover device according to claim 7, wherein the digital input signal is a digital video signal for generating a main picture and the analog input signal is an analog video signal for an additional picture selectively insertable into the main picture.

* * * * *